United States Patent [19]
Nichols

[11] Patent Number: 4,787,462
[45] Date of Patent: Nov. 29, 1988

[54] CULTIVATOR SWEEP

[75] Inventor: John W. Nichols, Sterling, Colo.

[73] Assignee: Nichols Tillage Tools, Inc., Sterling, Colo.

[21] Appl. No.: 5,609

[22] Filed: Jan. 21, 1987

[51] Int. Cl.[4] .................... A01B 23/02; A01B 35/26
[52] U.S. Cl. .................... 172/730; 172/771; D15/29
[58] Field of Search ............ 172/730, 731, 732, 733, 172/771

[56] References Cited

U.S. PATENT DOCUMENTS

| | | | |
|---|---|---|---|
| 104,754 | 6/1870 | Miner | 172/730 |
| 147,633 | 2/1874 | Haiman | 172/730 |
| D. 277,862 | 3/1985 | Johnson | 172/730 |
| 2,351,388 | 6/1944 | Baxter | 172/730 X |
| 2,595,353 | 5/1952 | Graham | 172/730 |
| 3,038,424 | 6/1962 | Johnson | 172/730 X |
| 3,556,229 | 1/1971 | Hawkins | 172/730 |

Primary Examiner—Richard J. Johnson
Attorney, Agent, or Firm—John L. Isaac

[57] ABSTRACT

A sweep is disclosed for use with an earth-cultivating implement and includes an elongated body terminating in a front nose portion. A stem is provided for attaching the body to the implement. A pair of laterally extending wing members diverge rearwardly from the body, each terminating at one end with the body to form the front nose portion while terminating at its opposite distal end in a top portion. Each wing member defines a continuous front cutting surface along its forward edge between the nose and tip portions thereof, the cutting surface being shaped in a concave curve between the nose and tip portions. Finally, each wing member further defines a continuously concave bottom surface which extends between the front cutting surface and the rear edge of the wing member.

14 Claims, 2 Drawing Sheets

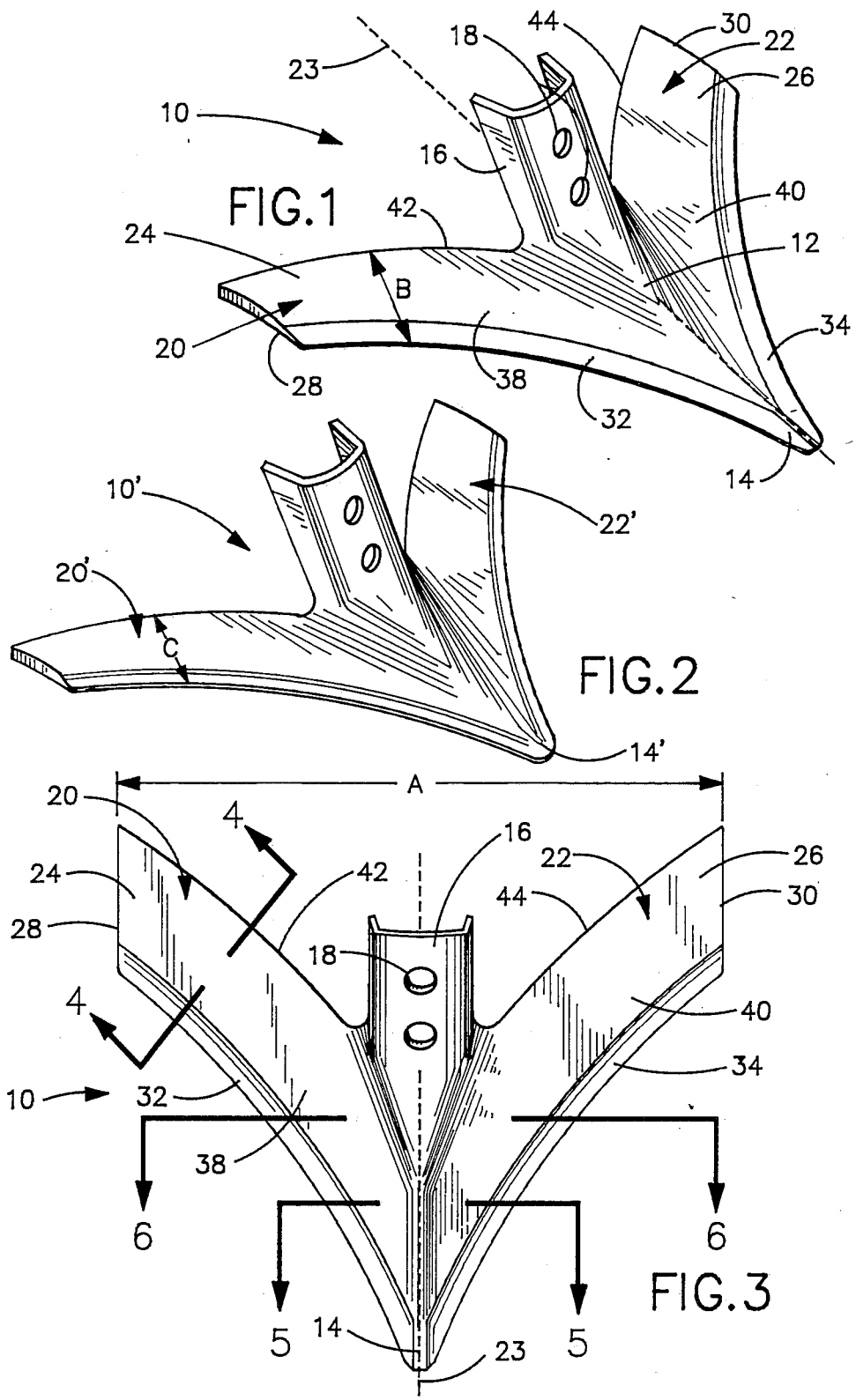

CULTIVATOR SWEEP

BACKGROUND OF THE INVENTION

1. Field of the Invention

This invention relates to agricultural cultivating tools which are attached to a standard or other tool support portion of a cultivating implement and, more particularly, to an improved cultivating sweep. Specifically, the present invention relates to an improved sweep design which permits uniform wear across the face of the sweep without narrowing the overall width of the sweep or blunting its point.

2. Description of the Prior Art

A wide variety of cultivating tools have evolved over the years for the tillage of soil. Such tools have been designed for a variety of purposes and soil conditions. Wing sweeps evolved for the purpose of performing the function of cutting off or uprooting weeds as well as for breaking up or mulching the surface of the soil in order to conserve soil moisture.

Wing sweep designs generally include a forwardly pointed body which is attached to a cultivating implement of some sort. Such wing sweeps include a pair of blades or wings which extend rearwardly from opposite sides of the body, or in some cases, a single blade or wing on one side of the body only. The body wings have customarily been provided with cutting edges extending rearwardly from the point of the body and along the outer front edges of the wings, the wings and the body being shaped so that the cutting edges are in the pattern of a "V" with the apex of the "V" being at the point. In many types of such sweeps, the V-pattern edge lies substantially in a plane. In the transverse direction, the wing or blade inclines upwardly and inwardly from the edge.

Such sweeps are adapted for use on cultivator implements that are drawn by tractors whereby they are propelled at a high forward velocity through the soil and subjected to substantial mechanical strains. Examples of wing sweep designs which exist as part of the prior art are disclosed in U.S. Pat. Nos. 2,351,388, 2,595,353, 2,704,499 and 3,038,424. As can be seen from these particular prior art patents, the V-shaped wing sweep design as described above is common. The basis for this V-shape design resides in the modern approach to sweep cultivation wherein evaporation of moisture from soil can be reduced if a layer of the surface soil is sliced or sheared off from the underlying soil and then replaced with a minimum of soil agitation with the soil surface being left relatively level without furrows and ridges. The sweep designs of the above-referenced prior art patents contribute to this concept of cultivation and mulching in various ways and include wings that diverge rearwardly in a "V" so that the soil flows rearwardly over the body of the sweep and falls by gravity downwardly between the stem and wings and is not thrown or plowed violently toward the sides. The soil is thus replaced on the ground surface between the wings rearwardly of the sweep and avoids the plowing of a furrow as in older type designs.

Unfortunately, there are some disadvantages to the standard V-shaped wing sweep design as disclosed in the referenced patents. More specifically, a common problem is that since the tip or nose of the sweep is the first point of penetration into the soil and receives the brunt of the wear as the sweep is pulled through the soil, the tip will generally wear faster than the rest of the sweep wing portions. Thus, in the V-shape designs, the nose or tip of the sweep tends to flatten to a very blunt shape. When this occurs drawing of the sweep through the soil can become very difficult since the tip is not sufficiently sharp to cause easy initial separation of the soil and penetration of the sweep through the soil. Another wear characteristic of the existing sweep designs is that such sweeps also tend to wear faster at the distal tip portions of the wings as opposed to the center of the wings. This wearing of the end portions of the wings tends to reduce the width of the sweep during its lifetime thus narrowing the path which the sweep makes through the soil. Since the purpose of the sweep is to shear as much surface soil as possible at one time, this narrowing of the sweep reduces the effectiveness and efficiency of the cultivating tool carry the sweep or a plurality of such sweeps.

Finally, sweeps have incorporated a cutting edge inclined to the surface of the ground in order to increase the penetration and cutting capability of the sweep. In order to increase the angle of inclination to the ground, the rear portions of the wing members have generally been designed to be uplifted relative to the ground surface as in U.S. Pat. Nos. 2,352,388 and 2,704,499. A problem with such uplifting of the rear portion of the sweep is that while it will achieve better penetration into the ground, the elevation of the rear portion of the sweep will tend to increase the agitation of the soil. This is an undesirable characteristic according to more modern cultivation techniques. Consequently, there is still a need for a wing sweep design which provides efficient penetration into the soil with minimum agitation of the soil so as to achieve the desired shearing of the soil. Moreover, there is still a need for such a tool which will not only perform the referenced function efficiently but will wear evenly so as to provide maximum efficiency of use throughout the entire life of the wing sweep and which will not wear unevenly so as to bring about premature replacement of the wing sweep.

SUMMARY OF THE INVENTION

Accordingly, it is one object of the present invention to provide a cultivator sweep having improved wear characteristics.

It is another object of the present invention to provide a cultivator sweep having improved soil penetration and drag characteristics.

Yet another object of the present invention is to provide an improved wing sweep having a wing design which permits even and constant wear along the entire width of the cutting edge of the sweep without narrowing the sweep.

A further object of the present invention is to provide an improved wing sweep which permits the maintenance of a sharp nose portion throughout the full lifetime of the sweep.

To achieve the foregoing and other objects and in accordance with the purpose of the present invention, a sweep is provided for use with an earth-cultivating implement. One embodiment of the sweep preferably includes an elongated body terminating in a front nose portion. A stem is provided for attaching the body to the earth-cultivating implement. A pair of laterally extending wing members diverge rearwardly from the body, each terminating at one end with the body to form the front nose portion while terminating at its other distal end in a tip portion. Each wing member defines a continuous front cutting surface along its forward edge between the nose and tip portions thereof, the cutting surface being concavely curved in shape between the nose and tip portions. Finally, each wing member further defines a continuously concave bottom surface which extends between the front cutting surface and the rear edge of the wing member.

BRIEF DESCRIPTION OF THE DRAWINGS

The features of the present invention which are believed to be novel are set forth with particularity in the appended claims. The invention, together with further objects and advantages thereof, may best be understood by reference to the following detailed description taken in conjunction with the accompanying drawings in which:

FIG. 1 is a perspective view of a wing sweep constructed in accordance with the present invention;

FIG. 2 is a perspective view of the wing sweep of FIG. 1 after significant test use and wear;

FIG. 3 is a top view of the wing sweep of FIG. 1;

DETAILED DESCRIPTION OF THE PREFERRED EMBODIMENTS

Figure 4:
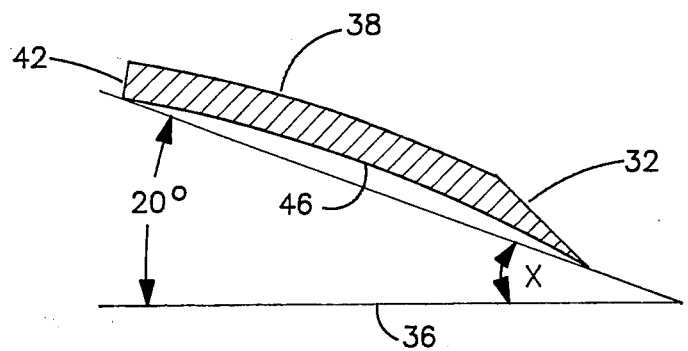
FIG. 4 is a cross-sectional view of the wing member of the sweep taken substantially along line 4—4 of FIG. 3.

With particular reference to FIGS. 1 and 3, a sweep 10 is illustrated. The sweep 10 preferably includes a main body portion 12 which is elongated and forwardly pointed to terminate in a front nose portion 14. Projecting upwardly and rearwardly from the rear portion of the body 12 is a stem 16 which is utilized for securing the sweep 10 to a shank (not illustrated) or other tool support member of a standard cultivating device such as a plow or the like. In preferred form, the stem 16 is generally U-shaped in cross-section and includes a plurality of apertures 18 designed to receive screws or the like (not illustrated) to attach the sweep 10 to the support member of a cultivating instrument.

A pair of wing members 20, 22 extend laterally outwardly from the body 12 and diverge rearwardly relative to the longitudinal axis 23 of the body 12. The longitudinal axis 23 defines the line of travel for the sweep 10, and each wing 20 is preferably a mirror image of the wing 22 on the opposite side of the axis 23. The wing members 20, 22 join each other along the axis 23 to form the nose portion 14 at the forward, innermost ends thereof. The outermost or distal ends 24, 26 of the wing members 20, 22 terminate along flat edge surfaces 28, 30. The edges 28, 30 are preferably aligned substantially parallel with the longitudinal axis 23. This design aspect is completely inopposite from standard prior arts sweep construction. The advantage of having the terminal edges 28, 30 of the wings 20, 22 substantially parallel with the line of travel of the sweep 10 is that this construction enables the wing sweep 10 to maintain a uniform width "A" as the front cutting surface thereof, to be described below, gradually wears. Prior art sweep designs have typically resulted in a narrowing or reduction of the width "A" as the sweep was subjected to wear during its use.

Referring now in particular to FIGS. 1 and 3-6, the front or forward edge of each wing 20, 22 is defined in the form of a cutting surface 32, 34. As can be clearly seen in FIGS. 4-6, the cutting edge 32, 34 is in the form of a surface having a plane substantially steeper relative to the plane 36 of the ground surface than the more rearwardly disposed portions 38, 40 of each wing member 20, 22. A particularly unique aspect of the cutting surface 32, 34 of the wings 20, 22 is that the cutting surfaces 32, 34 are concavely curved in shape between the nose portion 14 and each of the distal end portions 24, 26.

The concave shape of each cutting surface 32, 34 is in the form of an arc which is defined by a circle having a radius of curvature ranging preferably from 16-24 inches. The important aspect of the arc or curvature of the cutting surfaces 32, 34 is not the actual size of the radius which defines the arc but rather the fact that the concave curvature shape causes the nose portion 14 to be substantially elongated relative to prior art designs so as to position a much larger amount of the wing sweep bulk at the forward end of the sweep in the form of the pointed nose portion 14. This aspect of the invention ensures that as the wing sweep wears, as more clearly described below, the nose portion 14 will remain pointed and relatively sharp so as to continue to penetrate the ground as necessary for efficient operation of the sweep 10. Prior art designs having a less elongated nose defined by V-shaped cutting edges resulted in severe blunting of the tip or nose so as to reduce the effectiveness and efficiency of the sweep as it is drawn through the ground.

While the actual radius of curvature of the surfaces 32, 34 of the invention may vary depending on the requirements and application for the sweep 10, a field cultivator sweep of 4-12 inches in total width "A" will generally require or have a radius of curvature along the cutting edges 32, 34 of 16 inches. Where the applications require a larger sweep 10 having an overall width "A" of 12-18 inches, the radius of curvature for the cutting edges 32, 34 is preferably 24 inches.

Referring to FIGS. 1 and 2, the rear surfaces 42, 44 of each wing member 20, 22 are drawn along the same arc as the front cutting surfaces 32, 34. Thus, the overall depth as designated by line "B" of each wing 20, 22 is substantially uniform along the entire length of the wings 20, 22 which extend outwardly beyond the body portion 12. As can be seen from FIG. 2, the design of the instant invention and in particular the arc or curvature of the front cutting edges 32, 34 and the axially aligned distal end surfaces 28, 30, permits the nose portion 14' to remain relatively sharp and pointed even after substantial wear as well as to maintain the overall width "A". In this manner, while the total depth "C" of each wing 20', 22' of the sweep 10' is reduced as compared to "B" of sweep 10, it is reduced in a uniform manner so as to retain the overall shape and size of the wing sweep 10' even after substantial field use. This provides substantial improvements and increased life of the wing sweep 10' even after it has suffered severe wear.

Figure 5:
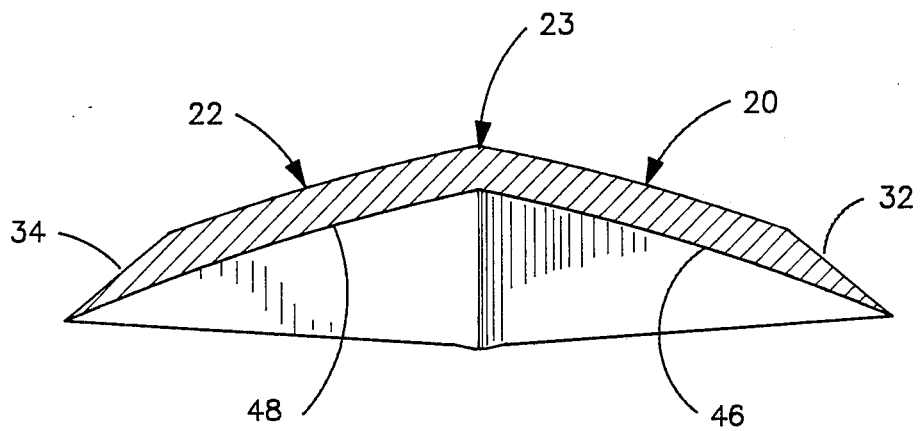
FIG. 5 is a cross-sectional view through the wing sweep of FIG. 3 taken substantially along line 5—5 of FIG. 3.
Figure 6:
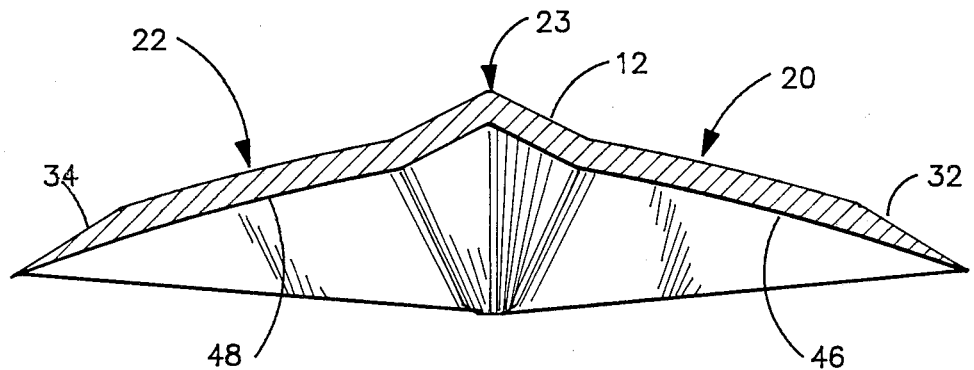
FIG. 6 is a cross-sectional view taken through the wing sweep substantially along line 6—6 of FIG. 3.

Referring now in particular to FIGS. 4-6, the bottom surfaces 46, 48 of each wing member 20, 22 are also concavely curved in the form of an arc defined by a circle's radius of preferably 10 inches. However, the size of the radius which defines the curvature of the surfaces 46, 48 may be varied in accordance with the overall size of the sweep 10 and the field application thereof. The continuously concave shape of the surfaces 46, 48 permits a relatively steep angle of inclination as indicated by angle X without requiring a substantial elevation of the rear surfaces 42, 44 of the wings 20, 22 relative to the ground surface plane 36. Prior art designs permitted or required a dual planar inner surface design which provided a steep angle of inclination but nonetheless elevated the rear surface of the wing an amount sufficient to create some detrimental effects. This relates the fact that the higher the rear edge or surfaces 42, 44 above the ground surface relative to the cutting edges 32, 34, the greater the distance the sheared ground must fall to return to the surface after the sweep 10 has passed through the ground. The greater the distance the sheared dirt falls, the greater the agitation, which is undesirable as previously described. Thus, the concave shape of the bottom surfaces 46, 48 permits the steep angle of inclination X without undue or unnecessary elevation of the rear edges 42, 44. The angle of inclination X may preferably be varied anywhere from 7°–25° depending upon the type of use as well as upon the type of soil. For instance, soil conditions of Texas, Oklahoma, Kansas and the like generally demand that the sweep 10 run flatter and have an angle of inclination of approximately 7°. On the other hand, soil in northern areas such as Montana, Minnesota, Canada and the like demand a higher lift of approximately 21° angle of inclination. Thus, this angle may be varied by varying the arc of the surface 46, which is in turn varied by defining the arc by a radius of curvature of various lengths.

As can be seen from FIGS. 5 and 6, the concavely curved shape of the bottom surfaces 46, 48 of the wings 20, 22 also results in an upwardly concave shape to the entire underside of the wing sweep 10. Moreover, it also provides an inverted V-shape cross-section at the intersection of the wings 20, 22 and the body 14 which provides an interruption of the flat plane that normally occurs in this area in prior art designs. This particular feature of the present invention provides greater strength in this area of the wing 10 which is subject to maximum leverage stress.

A sweep 10 was constructed in accordance with the above-described design and then put into actual field use under heavy and severe conditions, that is use in heavy, stony soil. The sweep was then used in such soil over a period of months, and the sweep was observed and evaluated. FIG. 2 is an illustration of the sweep 10' after such use. In addition, a conventional sweep design similar to that illustrated in U.S. Pat. Nos. 2,351,388 and 2,704,499 was placed into use under the same use and field conditions. A comparison of the sweep design of the present invention to that of the conventional sweep design after several months of heavy use indicated that the sweep of the present invention provided 20-30% more wear capability of that of the conventional sweep design. In other words, the conventional sweep designs wore out 20-30% faster than that of the design of the present invention. As can be seen from FIG. 2, the present invention permitted the sweep 10' to maintain a uniform wing depth "C", the same sweep width "A" as it had prior to field testing the sweep 10, and retained a pointed nose portion 14'. It should further be noted at this point that the elongated nose 14 of the sweep 10 of the present invention also permits the sweep 10 to push more material out front thereby reducing stress compared to conventional sweep designs.

The above arrangement of the present invention provides a cultivating sweep which has significantly improved wear characteristics which in turn provide a substantial longer lifetime of use. Moreover, not only are the wear characteristics improved, but they are improved so as to continue to permit the sweep of the invention to be maintained at its maximum efficiency and capability even after prolonged wear and use as opposed to decreased efficiency during use as in prior art designs. Finally, the design of the present invention permits easier soil penetration of the sweep due to the elongated point or nose portion of the sweep which is in turn due to the concavely curved front cutting edges of the sweep. Thus, a cultivator sweep is provided which has not only improved efficiency and ease of operation but also a longer life due to improved wear characteristics.

It will be understood that the foregoing description of the invention may be embodied in other specific forms without departing from the spirit or central characteristics thereof. The present examples and embodiments, therefore, are to be considered in all respects as exemplary only and that the scope of the present invention to be limited to the appended claims as interpreted in view of the prior art. Equivalent structures may be employed, as described, to provide the objectives and advantages described herein,

I claim:

1. A sweep for use with an earth-cultivating implement, said sweep comprising:
   an elongated body terminating in a front nose portion;
   stem means for attaching said body to said implement;
   a pair of laterally extending wing members diverging rearwardly from said body, each terminating at one end with said body to form said front nose portion while terminating at its opposite distal end in a tip portion; and
   each said wing member defining a continuous front cutting surface along its forwrad edge between said nose and tip portions, said cutting surface being shaped in a concave curve between said nose and tip portions, and each said wing member further defining a substantially uniformly curving, concave bottom surface extending between said front cutting surface and the rear edge of said wing member.

2. The sweep as claimed in claim 1, wherein the longitudinal axis of said elongated body defines the direction of travel of said sweep, and wherein each said tip portion of said wing members terminates in a side edge surface which is aligned substantially parallel to said longitudinal axis.

3. The sweep as claimed in claim 1, wherein the depth of each said wing member from said forward edge to said rear edge is substantially uniform along the portion of said wing extending laterally from said body.

4. The sweep as claimed in claim 1, wherein the bottom surface of said body and said wings is concaved upwardly in the form of a generally inverted V-shaped cross-section taken perpendicularly to the longitudinal axis of said sweep to provide increased strength and reduced soil resistance and wear.

5. The sweep as claimed in claim 1, wherein said concave bottom surface of each said wing portion is sufficiently curved to provide a lift angle of approximately 7°–25° from the horizontal plane.

6. The sweep as claimed in claim 1, wherein the curvature of each said wing cutting surface is an arc defined by a circle having a radius of 16–24 inches.

7. The sweep as claimed in claim 2, wherein the curvature of said wing cutting surface and the curvature of said concave bottom surface of each wing member are sized and shaped to provide uniform wear along the length of said cutting surface while maintaining cutting surface curvature shape as well as a sharp front nose portion.

8. The sweep as claimed in claim 2, wherein the arc of curvature of said front cutting surface is sized and shaped to elongate said front nose portion to permit wear of said nose portion while maintaining said nose portion in a generally sharp, pointed condition during such wear.

9. A cultivator sweep comprising a pair of wing members interconnected at one end along a longitudinal axis to form a front nose portion and diverging rearwardly from said nose portion and said axis to terminate in distal end portions, each said wing member having a concavely curved front cutting surface extending from said nose portion to said distal end portion to provide an elongated front nose portion, and a substantially uniformly curving concave bottom surface extending from said front cutting surface to the rear edge of said wing member to provide a sharp angle between said cutting surface and the ground without creating significant elevation of the rear edges of said wings relative to said ground.

10. The sweep as claimed in claim 9, wherein said distal end portions are sized and shaped to prevent narrowing of said sweep between said distal end portions as said sweep experiences wear during use.

11. The sweep as claimed in claim 10, wherein said distal end portions terminate in a surface which is substantially parallel to said longitudinal axis and the direction of travel of said sweep during use.

12. The sweep as claimed in claim 9, wherein said sharp angle between said cutting surface and the ground is about 7°–25° above the horizontal.

13. The sweep as claimed in claim 12, wherein said sweep further includes means for attaching said sweep to a cultivating instrument to maintain said cutting surface angle relative to the ground during use of said sweep.

14. The sweep as claimed in claim 11, wherein the arc of curvature of said front cutting surface is sized and shaped so that the distance between said front cutting surface and the rear edge of each said wing member along the rearwardly diverging portions thereof is maintained substantially uniform as said sweep wears during use.

* * * * *